Aug. 26, 1947.  L. W. HAAS  2,426,266
SUNGLASSES
Filed Sept. 6, 1945
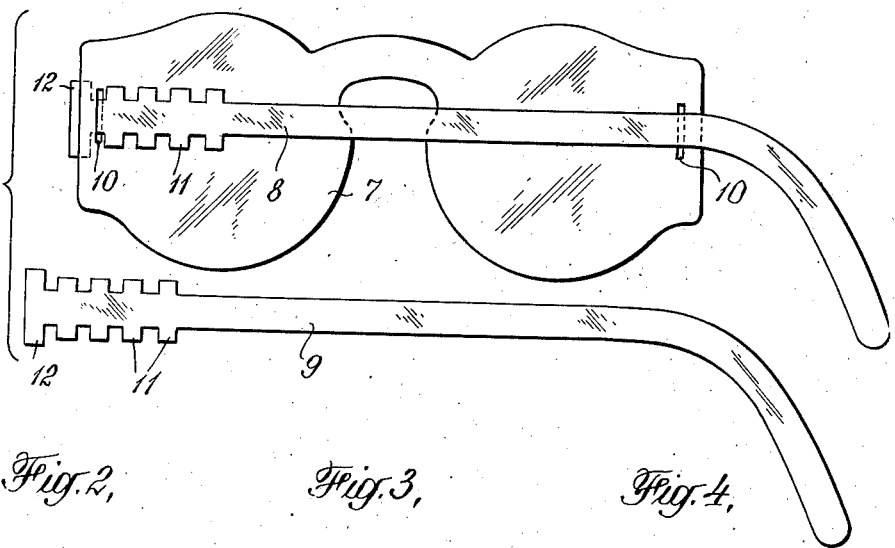
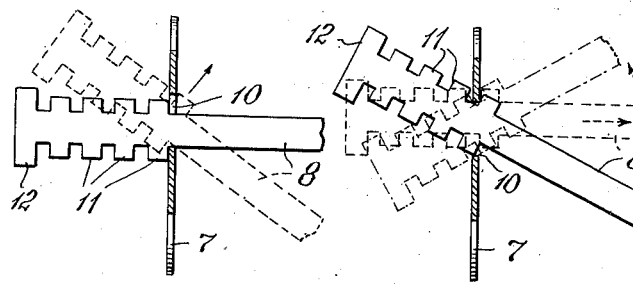
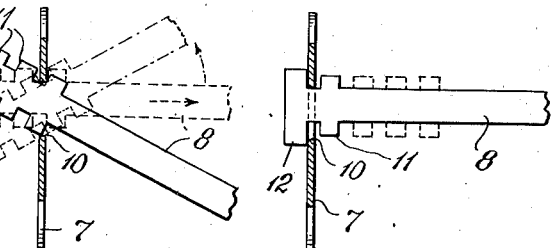
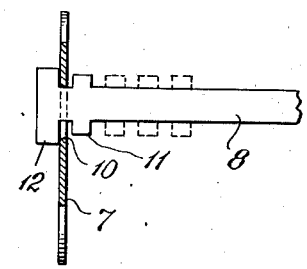
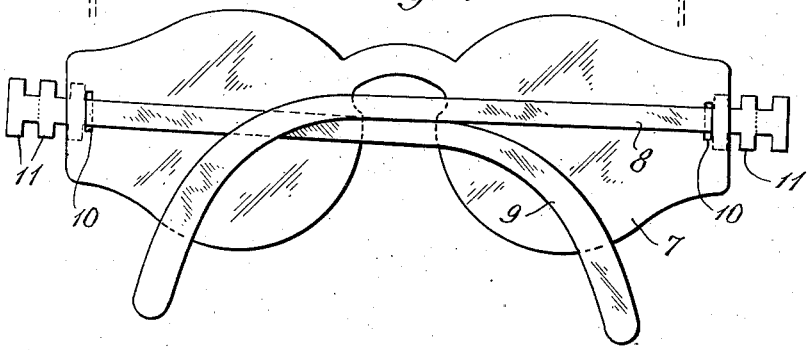
INVENTOR
LOTTE W. HAAS,
BY
ATTORNEYS Patented Aug. 26, 1947

2,426,266

UNITED STATES PATENT OFFICE 2,426,266

SUNGLASSES

Lotte W. Haas, New York, N. Y.

Application September 6, 1945, Serial No. 614,621

1 Claim. (Cl. 2—14)

This invention relates to sunglasses and is directed to the provision of an improved construction such that sunglasses may be made in a very serviceable form and at a very low cost.

The sunglasses of the present invention are made from three pieces of flat stock which may well be a plastic stock made in sheet form from which the parts for the sunglasses may be cut in a machine stamping operation. Sheet stock is now available made of plastic material which is well adapted for use as the material for sunglasses and which is of such strength and so lacking in brittleness as to permit of its use in sunglasses of the novel form which constitutes the present invention.

In accordance with the invention the sunglasses are made from three pieces stamped from flat sheet stock and the three pieces are connected together hingedly without the employment of any additional parts. The three pieces for the sunglasses are hinged together by the provision of openings in the bridge piece near opposite ends thereof and passing the ends of the temple pieces through these openings. These openings are preferably rectangular and of a width but little greater than the thickness of the sheet material from which the pieces of the sunglasses are cut.

An important feature of the invention resides in the construction employed in forming these hinges, particularly a novel construction which provides for adjustment of the effective length of the temple pieces whereby adjustment may be made to fit the wearer so that the glasses will be positioned accurately for use and be held against displacement. This novel construction is characterized by the provision of a plurality of projections, preferably of rectangular form, at opposite edges of the temple pieces near their outer ends. The openings in the bridge piece through which the temple pieces extend may be of such size that the portions of the temple pieces having these projections on them may not pass through the openings. When that arrangement is employed, the desired adjustment is effected by cutting off a pair or two or more pairs of the projections so that the portions of the temple pieces where these projections occur may pass through the openings and thereby increase the effective length of the temple pieces. When adjustment has been made in this manner to secure the desired length of the temple pieces, any portions of the outer ends of the temple pieces extending beyond the bridge piece which are no longer needed for adjustment purposes may be cut off.

A desirable alternative construction is to proportion the length of the openings in the bridge piece to the distance across the temple pieces where two of the projections occur with accuracy so that the vertical dimension of the openings is a little greater than the distance across the temple pieces. When this is done the temple pieces may be moved through the openings in the bridge piece by inclining them first one way and then the other enough to pass one projection at a time through the opening and thereby effect the desired adjustment without cutting off the projections. When the desired adjustment has been made, the projection ends of the temple pieces extending out beyond the bridge piece are no longer needed for the purposes of adjustment and may be cut off and any projections which have been moved to the inner side of the bridge piece may be cut off if that is deemed desirable.

Preferred constructions of sunglasses embodying the present invention are illustrated in the accompanying drawings to which reference is made for a better understanding of the invention. In the drawings, Fig. 1 is a plan view of sunglasses made in accordance with the invention; Figs. 2, 3 and 4 are detail views illustrating the procedure incident to making an adjustment of the effective length of the temple pieces; Fig. 5 is a sectional view illustrating the construction; and Fig. 6 is a view similar to Fig. 1 and illustrating a modified form.

As shown in the drawings, the sunglasses of the present invention consist of three pieces which are preferably cut in a stamping operation from flat stock in sheet form. The flat stock is preferably a plastic material which has the desired transparency. The material has some flexibility so that breakage by accidental dropping is eliminated. The bridge piece is shown at 7 and the two temple pieces at 8 and 9. The shape of the bridge piece 7 may be varied considerably; as shown in Figs. 1 and 6, they are of a shape which is well adapted for use.

At opposite ends the bridge piece is provided with vertical slots 10 and each of the temple pieces 8 and 9 is passed through one of these slots 10. Each slot is of a width slightly greater than the thickness of the material of the temple pieces, with the result that the temple piece may be swung angularly from a position substantially at right angles to the bridge piece as shown in Fig. 5 to folded positions as shown in Figs. 1 and 6. When so folded the sunglasses may be placed in an envelope or handbag or other suitable container without danger of injury.

Each of these temple pieces is provided with a plurality of projections along its lower edge and along its upper edge near its outer end. These projections are preferably substantially rectangular as shown in the drawings, but instead they may be of other shapes; for instance, they may have their corners rounded or they may be substantially semi-circular or other shape more or less approximating the rectangular or semi-circular.

Preferably the vertical dimension of the slots 10 is proportioned to the vertical dimension of the temple pieces across two of the projections, the proportioning being such that the temple pieces may be passed through the openings 10 by tilting them one way and then the other in the manner indicated in Figs. 2, 3 and 4.

Referring to Fig. 2, when the temple piece 9 is in the full-line position it cannot be moved to the right in the opening 10 but by shifting it to the dotted-line position the first projection 11 on the upper edge of the temple piece may be passed through the opening. Then by swinging the temple piece to the oppositely inclined position indicated by the dotted lines in Fig. 3, the first, or the first and second projections 11 on the lower edge of the temple piece may be passed through the slot. The material of the parts at the connecting edges of the slots and projections may yield slightly to accommodate this movement.

In this way the temple pieces may be moved through the slots in the bridge piece to such extent as may be necessary to make their effective length that which is appropriate for the wearer. If the temple pieces are moved through the slots until the last projections abut the bridge piece, as shown in Fig. 4, the maximum length of the temple pieces is obtained and these projections at the end of the temple piece may be of larger size as shown at 12 in Fig. 4. If lengthening to a less extent is desired, the temple pieces are moved only a portion of the distance they are shown to have been moved in Fig. 4, in which event a greater length of the temple pieces would extend beyond the bridge piece and if desired the excess material in this extension beyond the bridge piece can be cut off. Also, after the desired adjustment has been obtained, the projections 11 which have been passed through the slots 10 may be cut off if no new adjustment to a different position is contemplated.

Fig. 6 illustrates a modified construction in which the slots 10 are of less length in the vertical direction. Their length is such that the projections 11 may not be passed through them. When this construction is employed the sunglasses as assembled initially have their parts in the position in which they are illustrated in Fig. 6, the temple pieces then being of the minimum length which has been found to be desirable to effect an adjustment whereby the length of the temple pieces is increased, the pair of projections 11 adjacent to the slots 10 are cut off so that the bars of the temple pieces may be moved through the slots 10 until the next pair of projections 11 abuts against the front surface of the bridge 7, and similar additional pairs of projections are cut off to further increase the effective length of the temple pieces. After the desired adjustment has been effected, the undesired excess material of the temple pieces beyond the bridge piece can be cut off.

It will be apparent that the novel sunglasses above described can be used along with the usual glasses, putting the sunglasses close in front of the ordinary glasses, their very light weight adding to the convenience of doing this.

I claim:

Sunglasses consisting of a bridge piece and two temple pieces, the bridge piece having vertically disposed openings therethrough near its ends through which the temple pieces extend and the temple pieces having similar projections along their upper and lower edges in pairs with those of each pair opposite each other and the vertical dimension of the openings in the bridge piece being slightly less than the vertical dimension of the temple piece across a pair of the projections, whereby the projections preclude movement of the temple pieces in the direction of their length through the openings in the bridge piece but permit movement of the ends of the temple pieces having the projections thereon through said openings step by step, one projection at a time, by a rocking movement of each temple piece in the plane in which it lies.

LOTTE W. HAAS.

REFERENCES CITED

The following references are of record in the file of this patent:

FOREIGN PATENTS

| Number | Country | Date |
|--------|---------|------|
| 206,703 | Great Britain | Nov. 15, 1923 |